Jan. 17, 1967  L. GREINER  3,298,181
REACTION PROPULSION DEVICE
Filed Sept. 21, 1962  4 Sheets-Sheet 1
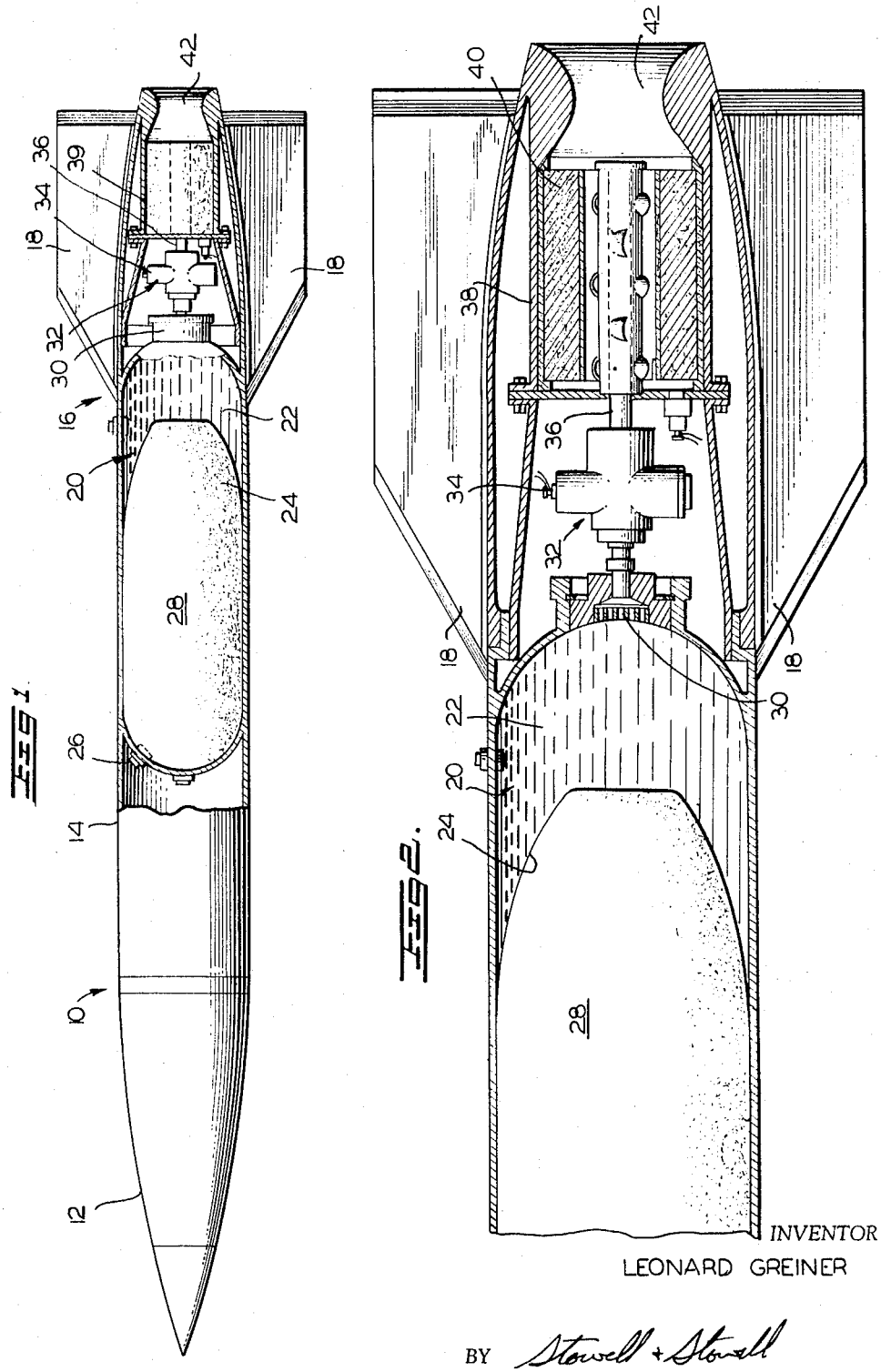
INVENTOR
LEONARD GREINER
BY Stowell + Stowell
ATTORNEYS Jan. 17, 1967   L. GREINER   3,298,181
REACTION PROPULSION DEVICE
Filed Sept. 21, 1962   4 Sheets-Sheet 2

INVENTOR
LEONARD GREINER

BY

ATTORNEYS

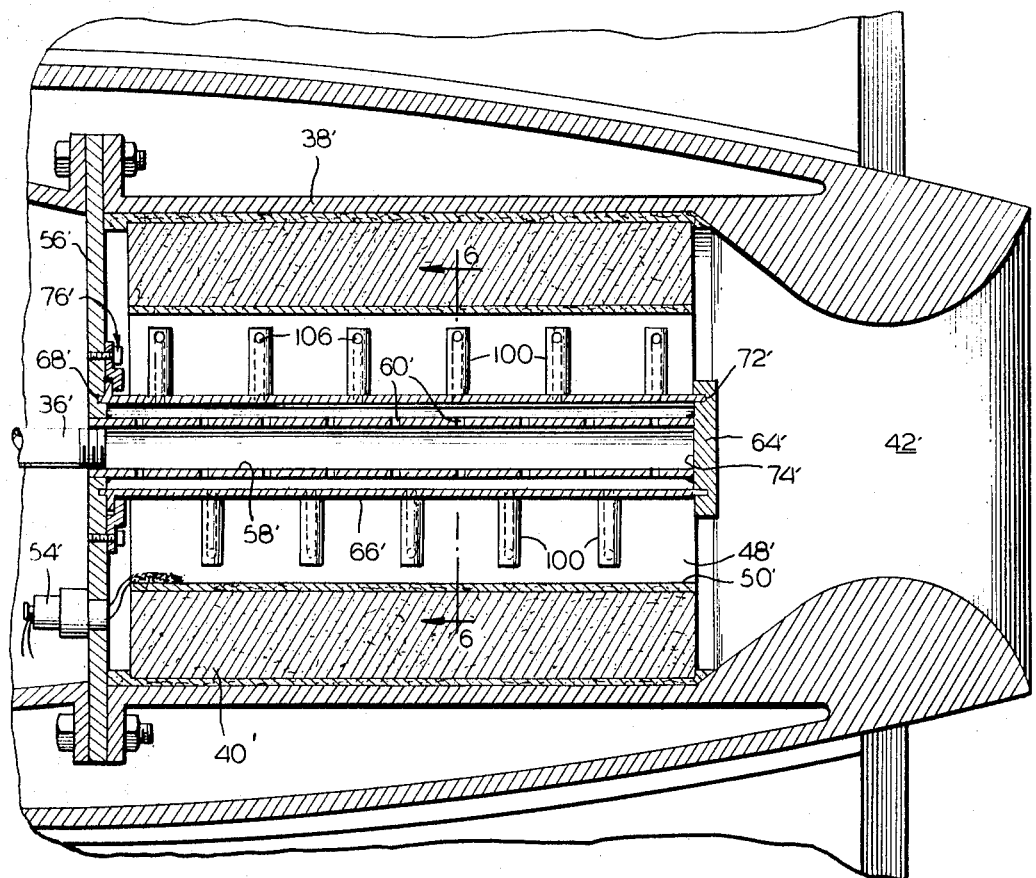
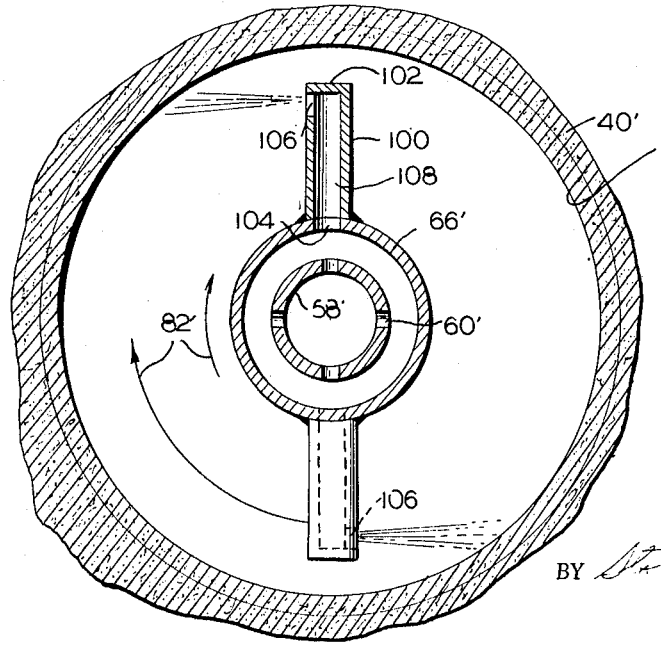

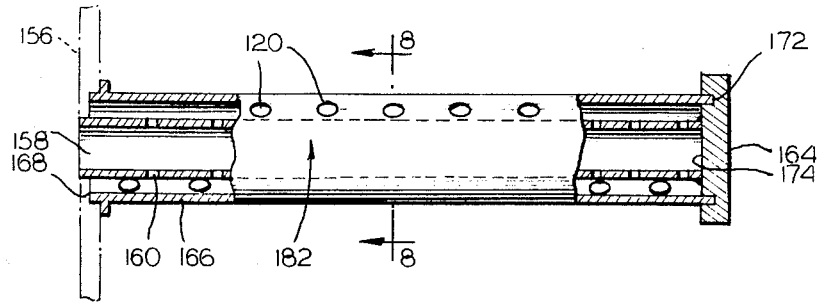
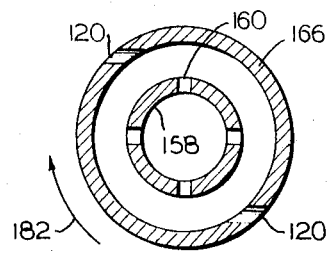
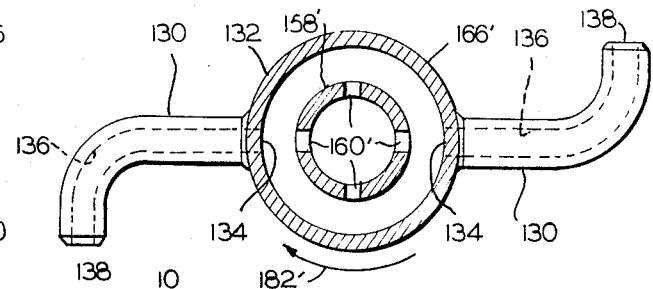
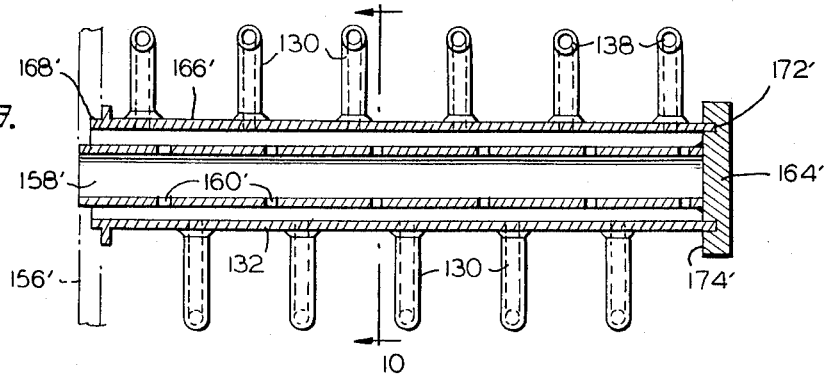
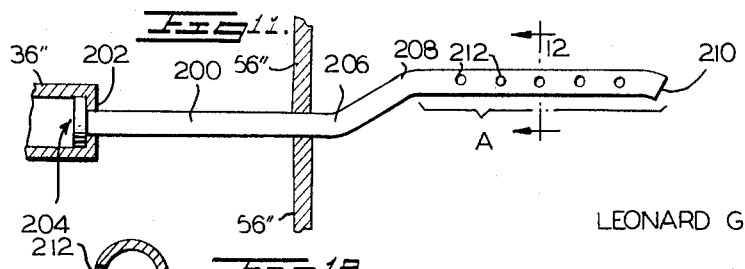
INVENTOR
LEONARD GREINER 3,298,181
REACTION PROPULSION DEVICE
Leonard Greiner, Richmond, Va., assignor to Texaco Experiment Incorporated, Richmond, Va., a corporation of Virginia
Filed Sept. 21, 1962, Ser. No. 225,965
8 Claims. (Cl. 60—251)

This invention relates to improvements in liquid-solid (hybrid) propellant reaction propulsion devices and in particular to improved means for promoting uniform erosion of the solid propellant when contacted by the liquid propellant of a liquid-solid propellant system.

In general, uniform burning or erosion of the solid propellant portion of hybrid rocket propellants does not occur if the liquid propellant is injected as a stream, fog, spray or vapor at one end of the solid grain and allowed to pass downstream to the reaction nozzle of the combustion chamber. Further it has been found that where the liquid propellant portion of a hybrid fuel is injected onto a surface of the solid propellant, severe spot erosion, channeling or worm-holing occurs where the stream or jets of liquid continuously contact the surface of the solid grain.

It has been found that substantially uniform erosion of a solid grain in a hybrid rocket propelled reaction propulsion device is brought about by continuously sweeping the exposed surface of the solid grain with the liquid propellant portion of the liquid-solid propellant system.

These and other objects and advantages of the present invention are provided in a liquid-solid propellant reaction propulsion device including a combustion chamber having a reaction outlet, a solid propellant in the reaction chamber provided with an opening therethrough communicating with the reaction outlet, and means for directing a liquid propellant to the surface of the solid propellant exposed by the opening therethrough comprising a member rotatably mounted within the opening in the solid propellant, said member having a length along its axis of rotation substantially coextensive with the length of the opening in the solid propellant, liquid propellant inlet means at one end of the rotatably mounted member, and a plurality of liquid propellant outlet openings disposed in spaced relationship along the rotatable member, and means for rotating said member to direct the said liquid propellant outlet openings about the surface of the solid propellant exposed by the opening therethrough.

The invention will be more particularly described with reference to the accompanying drawings wherein:

FIG. 1 is a partial sectional view of a space traveling reaction propulsion vehicle incorporating the improved injector means of the invention;

FIG. 2 is an enlarged fragmentary sectional view of the propulsion system for the reaction vehicle illustrated in FIG. 1;

FIG. 5 is a view similar to that illustrated in FIG. 3 of another form of injector means of the present invention;

FIG. 6 is a section substantially on line 6—6 of FIG. 5;

FIG. 7 is a fragmentary partial sectional view of a further form of the improved injector for a hybrid propellant system;

FIG. 8 is a section on line 8—8 of FIG. 7;

FIG. 9 is a view similar to that shown in FIG. 7 of a further form of injector for a hybrid rocket propellant system;

FIG. 10 is a section on line 10—10 of FIG. 9;

FIG. 11 is a view similar to that shown in FIG. 7 of a further form of improved injector means of the present invention; and FIG. 12 is a section on line 12—12 of FIG. 11.

Figure 3:
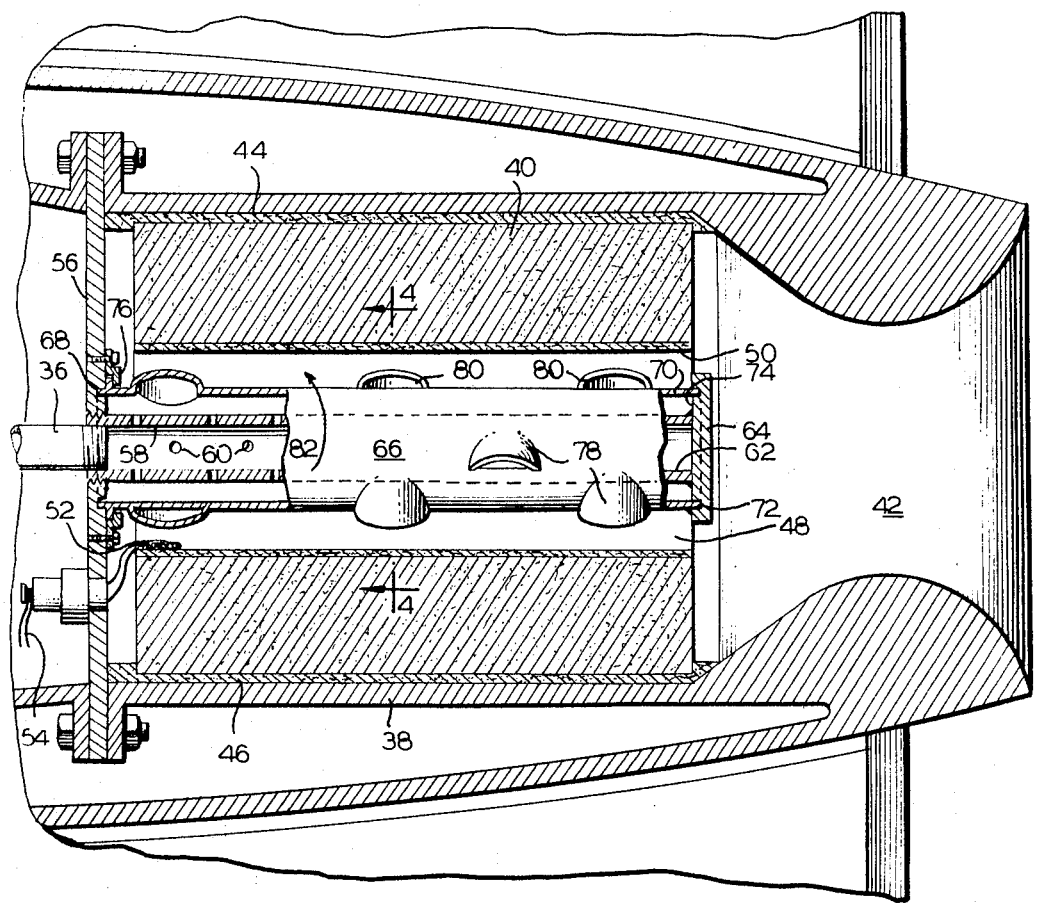
FIG. 3 is a greatly enlarged fragmentary sectional view of the combustion chamber and injector means for the rocket illustrated in FIG. 2.

Referring to FIGS. 1 and 2, there is shown a form of the improved reaction propulsion engine embodied in a missile which generally comprises an elongated housing or shell 10 having a streamline nose portion 12, an elongated body portion 14, and a tail portion 16 which tail portion may be provided with stabilizing fins 18 as is well known in the art.

The nose portion 12 and the forward section of the body portion 14 will not be further described as it will be appreciated that rockets constructed in accordance with the principles of this invention would be provided with a nose section suitable for the particular use for which the vehicle is designed.

For example, if the device is to be employed as an explosive missile the nose portion would house suitable high explosives and detonating devices therefor and where desired, control means for guiding the missile to a target. If the rocket is to be used for obtaining meteorological data or the like at high altitudes suitable indicating, recording and/or telemetering equipment would be provided in the nose section. Further, the form of the rocket would be determined to a large extent by its intended mission. For example, the hybrid liquid-solid propellant reaction propulsion device may comprise a basic missile, a booster or first stage for a plural stage vehicle or a sustainer section for a plural stage vehicle.

Received within the rearward portion of the body 14 of the vehicle is a tank 20 containing a suitable liquid propellant 22. A resilient bladder 24 may be used to separate the propellant 22 from the pressurized gas inlet means 26. Where desired the vehicle may include a separate high pressure gas tank and regulating means for directing the high pressure gas into the space 28 on the pressurized gas side of the resilient bladder 24 as shown and described in U.S. Patent 3,010,279, J. W. Mullen II et al., owned by applicant's assignee.

At the rearward end of the liquid propellant storage container or tank 20 is a liquid propellant outlet device 30 which is connected to a flow initiating valve 32 provided with an electric actuator 34. Similarly an electric actuator may be incorporated on the pressurized-gas inlet means 26. Liquid fuel from the flow control valve 32 is directed into the combustion chamber through a conduit 36 as to be more fully described hereinafter. Within the combustion chamber 38 there is maintained the solid propellant of the liquid-solid propellant system while the most rearward end of the combustion chamber is provided with a conventional outlet nozzle 42.

Figure 4:
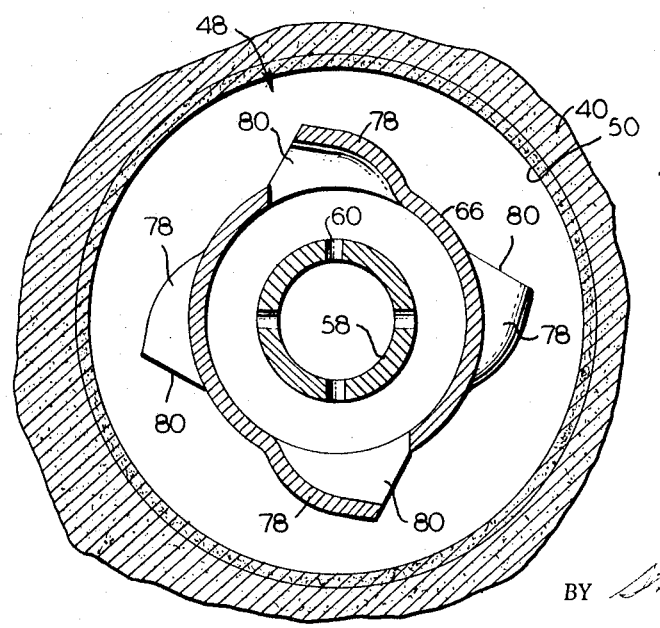
FIG. 4 is a section substantially on line 4—4 of FIG. 3.

Referring particularly to the FIGS. 3 and 4, about the inner wall of the cylindrical portion 44 of the combustion chamber 38 is mounted an annular band of solid fuel or propellant 40. The solid propellant 40 may be attached to the inner wall 44 of the combustion chamber by cement 46 as illustrated or the propellant may be cast-in-place, compression fitted and/or mechanically held in place as is known in the art. In the illustrated form of the invention, the bore or opening 48, through the annular block of solid propellant 40, is axially aligned with the opening in the nozzle 42. The opening 48 may be round as illustrated or cruciform or star shaped in cross section and the opening may be larger at one end than at the other end to obtain more uniform burning or erosion of the solid fuel over the entire burning cycle. Further the ends of the solid grain and, where desired, the surface thereof next to the combustion chamber wall might be provided with an inhibitor to prevent burning of these surfaces. The surface of the opening 48 may be coated with a suitable igniter mixture 50 which may comprise 49% magnesium sodium nitrate, 49% black powder and 2% nitrocellulose binder while a typical solid fuel 40 for the hybrid propellant system may comprise a solid grain containing 88.5% zirconium hydride, 9.5% ammonium perchlorate, 1% stearic acid, and 1% linseed oil compressed at a pressure in the order of 130,000 p.s.i.g.

The device may also include an electric match 52 connected to a suitable source of current through conductor 54. The electric current employed to energize the electric match 52 may be simultaneously applied to the electrically actuated flow initiating valve means 32 and the gas tank pressurizing means 26. If the fuel system is hypergolic, the igniter material 50 and the electric match 52 will not be needed.

The forward wall 56 of the combustion chamber 38 rigidly receives a conduit 58 provided with a plurality of radial openings 60 spaced along the conduit. In the illustrated form of the invention the number and size of the openings 60 permit generally uniform flow of the liquid propellant from the conduit 58. However, in some instances it is preferable to have the openings 60 in the inner tube 58 somewhat larger and/or closer together in the portion nearest the nozzle 42 to provide adequate flow at that end. Further, in some instances it is desirable to have less flow at the nozzle end since the temperature at the nozzle end is higher, and oxidizer injected upstream might not be completely reacted by the time it arrives adjacent the exit end of the combustion chamber. It will therefore be appreciated by those skilled in the art that the number, size and distribution of the openings in the inner tube and the outer rotatable member 66 may be variously modified from the specific arrangements illustrated herein to obtain the most uniform fuel erosion.

At the most rearward end 62 of the conduit 58 is secured, such as by welding, a circular end plate 64 which seals the end of the conduit 58 from the axial passage of liquid propellant. Rotatably mounted in spaced relationship about the conduit 58 is a tubular liquid propellant distributing means generally designated 66.

The forward end of the distributing means 66 rotates in a circular slot 68 formed in the forward wall 56 of the combustion chamber 38 and the rearward end 70 of the liquid propellant distributing means 66 is received in a circular slot 72 formed in the inner face 74 of the end plate 64. The cylindrical slots 68 and 72 in the forward wall 56 and end plate 64 are of such a size and are so spaced that the liquid propellant distributing means 66 may freely rotate within its mountings without an objectionable liquid leak. Where desired, suitable thrust surfaces 76 may be provided for the rotating distributor means 66.

Spaced about the cylindrical wall of the liquid propellant distributing means 66 are a plurality of dimples 78 open as at 80 to provide communication between the interior of the liquid propellant distributor means and the space within the bore 48 in the solid propellant 40. The openings 80 are directed at similar angular directions with respect to the radii on which they are located whereby when the liquid propellant issues from the openings 80 the distributor means 66 rotates in the direction of the directional arrow 82 and the liquid propellant is generally uniformly directed about the interior surface defined by the opening 48 through the solid propellant without worm-holing or spot erosion of the solid propellant.

To provide for generally uniform liquid contact on the surface defined by the bore 48 of the solid fuel, the length of the liquid propellant distributing means 66 is substantially coextensive with the length of the solid propellant 40 and the dimpled liquid propellant outlets 78 may be generally uniformly distributed throughout the length of the distributing means.

In operation of this form of the invention, employing as the solid propellant the zirconium hydride, ammonium perchlorate, stearic acid, linseed oil composition, a liquid propellant comprising 73.6% perchloric acid and 26.4% of water is provided in the liquid propellant tank 20 and the tank is pressurized to provide a liquid to solid propellant ratio of .417 at a design burning pressure of 600 p.s.i.g. The electrically actuated flow control valve 32 and the electric match 52 are energized whereby the liquid propellant passing from the tank through the control valve 32, the conduits 36 and 58 through the radial openings 60 in the conduit 58 into the space between the conduit 58 and the distributor means 66 flows out the dimpled outlets 78 and the Newtonian reaction from the expelled liquid causes the distributor means 66 to rotate rapidly bringing about a uniform sweep of the liquid propellant about the inner surface of the solid grain 40.

Other hybrid propellant systems may be readily employed with the reaction propulsion device hereinabove described and the following examples of liquid-solid propellant systems are satisfactory:

| Solid: | Liquid |
|---|---|
| LiH | $ClF_3$ |
| $N_2H_5N_3 \cdot N_2H_4$ (hydrazine azide hydrazinate) | $ClF_3$ |
| Li | $F_2$ |
| $B+N_2H_5N_3$ (hydrazine azide) | $ClF_3+BrF_5$ |
| $B+N_2H_5N_3 \cdot N_2H_4$ | $ClF_3+BrF_5$ |
| $B+NH_4N_3$ (ammonium azide) | $ClF_3+BrF_5$ |
| $Al+N_2H_5N_3$ | $HClO_4 \cdot 2H_2O$ |
| $ZrH_2$ | $ClF_3$ |

Referring to FIGS. 5 and 6 there is shown a modified form of liquid propellant distributing means of the invention wherein elements corresponding to those illustrated in FIGS. 1 through 4 are provided with primed reference characters. In FIGS. 5 and 6 the combustion chamber 38' is charged with an annular solid propellant 40' having an opening 48' therethrough and the exposed surface of the propellant 40' may be provided with an igniter mixture 50'.

This form of the invention, like that illustrated in FIGS. 3 and 4, is provided with a conduit 58' provided with a plurality of radial openings 60' for directing fuel received from the liquid propellant conduit 36' into the combustion chamber space defined by the surface of the solid propellant 40' exposed by the opening 48'. The rearwardly extended end of the conduit 58' is closed by an end plate 64' having a circular groove 72' provided on its inner face 74'. The forward wall 56' of the combustion chamber 38' is also provided with a circular groove 68' and a rotating fuel distributing means 6' is mounted with its rearward end in groove 72' and its forward end in groove 68'. Further as described with reference to FIGS. 3 and 4, thrust bearing surfaces 76' may be provided at the forward end of the rotating fuel distributing means 66'. The rotating fuel distributing means 66' has mounted thereon a plurality of tubular elements 100 having their extended ends 102 closed while the opposite end of each of the tubes 100 communicates with its respective bore 104 radially extending through the liquid propellant distributing means 66'. Further, each of the radially extending tubes 100 is provided with a liquid propellant outlet opening 106 generally directed 90° to the passage 108 extending through the tubes 100. Oppositely directed tubes 100, as more clearly shown in FIG. 6 of the drawings, have their outlet openings 106 facing in opposite directions whereby Newtonian reaction will cause the liquid propellant distributing means 66' to rapidly rotate in the direction of the directional arrows 82' so that the liquid propellant is swept across the inner surface of the solid propellant as described with reference to the form of the invention specifically shown in FIGS. 3 and 4 of the drawings.

Referring particularly to FIGS. 7 and 8 of the drawings, there is shown a further form of liquid propellant distributing means of the invention wherein structures corresponding to structures illustrated in FIGS. 5 and 6 are provided with corresponding reference characters preceded by the numeral 1. In FIGS. 7 and 8 a liquid propellant conduit 158 is mounted in the forward wall 156 of the combustion chamber and is provided with a circular end plate 164 at the opposite end. The forward wall 156 of the combustion chamber and the circular end plate 164 are provided with circular grooves 168 and 172 respectively, to rotatably mount the liquid propellant distributing means 166.

The liquid propellant conduit 158 is provided with spaced radially extending openings 160 while rotating liquid propellant distributing means 166 is provided with a plurality of spaced openings 120. As more clearly illustrated in FIG. 8 of the drawings, the openings 120 are angularly directed through the wall of the tube whereby when the liquid propellant issues therefrom, the liquid propellant distributing means 166 is caused to rapidly rotate in the direction of the directional arrows 182. Operation of this form of the invention is equivalent to the operation of the forms of the invention shown and described with reference to FIGS. 1 through 6.

In FIGS. 9 and 10 a further form of liquid propellant distributing means is illustrated and the reference characters applied to structures corresponding to structures shown in FIGS. 7 and 8 are provided with primed reference characters. In this form of the invention the liquid propellant conduit 158', provided with a plurality of radially extending spaced openings 160', is rigidly mounted to the forward wall 156' of the combustion chamber and the rearward end of the conduit 158' has secured thereto a circular end plate 164' provided with a circular groove 172' on its inner face 174'.

The inner surface of the forward wall 156' of the combustion chamber is also provided with a circular groove 168' which mounts the forward end of the liquid propellant distributing means 166'. The liquid propellant distributing means 166' thus rotates between the plate 164' and the wall 156' of the combustion chamber and liquid propellant directed from the conduit 158' through its openings 160' issues into a plurality of tubular elements 130 connected to the external surface 132 of the liquid propellant distributing means 166'. Each of the tubular elements 130 is attached to the surface 132 of the liquid propellant distributing means 166' over a radial bore 134. The extended radial end of each of the tubular elements 130 is bent whereby the outlet end 138, of each of the tubular elements 130, discharges liquid propellant generally at right angles to the axis of the bores 134 in the liquid propellant distributing means 166' and, for example, reaction of the expelled liquid causes the liquid propellant distributing means 166' to rapidly rotate in the direction of the directional arrow 182'. The liquid propellant is thus caused to uniformly sweep across the surface of the solid propellant grain.

In FIGS. 11 and 12 a further form of the present invention is illustrated and structures shown therein corresponding to structures shown in FIGS. 1 through 4 are provided with double primed reference characters. In FIGS. 11 and 12 the rearward end 202 of the conduit 36" is provided with a flange against which is mounted a liquid propellant distributing device 200. The liquid propellant distributing device 200 is rotatably mounted in the outlet end of the liquid propellant conduit 36" by suitable bearing means generally designated 204. The liquid propellant distributing means 200 may be provided with suitable bushings, not shown, where the tube passes through the forward wall 56" of the combustion chamber to reduce to a minimum leakage of propellant and pressure through the opening in this wall. The liquid propellant distributing means 200, after passing through the forward wall 56" of the combustion chamber, is provided with an offset bend 206 followed by a straightening bend 208 whereby the axis of the portion A of the means 200 is offset from the axis of the opening in the means 200 where it passes through the opening in the forward wall of the combustion chamber. The end 21 of the liquid propellant distributing means 200 is closed while that portion designated A of the member is provided with a plurality of spaced outlet openings 212. The liquid propellant outlet openings 212 are directed at an angle to the off-set of the liquid propellant distributing means 200 and when liquid propellant issues from the openings reaction of the expelled liquid causes the liquid propellant distributing means 200 to rapidly rotate about its bearing means 204 whereby liquid is uniformly swept across the inner surface of the solid grain propellant.

In each of the forms of the invention described herein reaction of the liquid propellant portion of the liquid-solid propellant systems issuing from the outlets of the distributing means causes the liquid propellant distributing means to rotate rapidly. However, other forms of drive means may be employed alone or in conjunction with the reaction drive described herein. For example, a drive turbine may be employed in the liquid propellant line between the tank 20 and the combustion chamber. Other satisfactory drive means for the liquid distributing means may comprise a drive turbine in the exhaust stream from the combustion chamber, a drive turbine provided with its own source of motive fluid, or by auxiliary electrically energized motor means.

From the foregoing description of the means for carrying out the invention, it will be seen that new and improved liquid-solid propellant reaction propulsion devices have been provided the aims, objects and advantages hereinbefore set forth are fully achieved.

I claim:

1. In a liquid-solid propellant reaction propulsion device including a combustion chamber having a reaction outlet, a solid propellant in the combustion chamber provided with an opening therethrough communicating with the reaction outlet, and means for directing a liquid propellant to the surface of the solid propellant exposed by the opening comprising a member rotatably mounted within the opening in the solid propellant, said member having a length along its axis of rotation substantially coextensive with the length of the opening in the solid propellant, liquid propellant inlet means at one end of the rotatably mounted member, and a plurality of liquid propellant outet openings spaced along the rotatable member and means for rotating said member to direct the said liquid propellant outlet openings about the surface of the solid propellant exposed by the opening therethrough.

2. In a liquid-solid propellant reaction propulsion device including a combustion chamber having a reaction outlet, a solid propellant in the combustion chamber provided with an opening therethrough communicating with the reaction outlet, and means for directing a liquid propellant to the surface of the solid propellant exposed by the opening comprising a member rotatably mounted within the opening in the solid propellant, said member having a length along its axis of rotation substantially coextensive with the length of the opening in the said propellant, liquid propellant inlet means at one end of the rotatably mounted member, and a plurality of liquid propellant outet openings spaced along the rotatable member, said outlet openings being angularly directed with respect to the axis of rotation of the rotatably mounted member whereby reaction of the liquid expelled therethrough causes the member to rotate rapidly and direct the said liquid propellant outlet openings about the surface of the solid propellant exposed by the opening therethrough.

3. In a liquid-solid propellant reaction propulsion device including a combustion chamber having a reaction outlet, a solid propellant in the combustion chamber provided with an opening therethrough communicating with the reaction outlet, and means for directing a liquid propellant to the surface of the solid propellant exposed by the opening comprising a member rotatably mounted within the opening in the solid propellant, said member having a length along its axis of rotation substantially coextensive with the length of the opening in the solid propellant, liquid propellant inlet means at one end of the rotatably mounted member, and a plurality of liquid propellant outlet openings spaced along the rotatable member, said outlet openings comprising dimples formed in the surface of said rotatably mounted member, said dimples having generally tangentially directed outlets whereby reaction of the liquid expelled through said generally tangentially directed outlets causes the rotatably mounted member to rotate rapidly and direct the said liquid propellant outlet openings about the surface of the solid propellant exposed by the opening through the solid propellant in the reaction chamber.

4. In a liquid-solid propellant reaction propulsion device including a combustion chamber having a reaction outlet, a solid propellant in the combustion chamber provided with an opening therethrough communicating with the reaction outlet, and means for directing a liquid propellant to the surface of the solid propellant exposed by the opening comprising a member rotatably mounted within the opening in the solid propellant, said member having a length along its axis of rotation substantially coextensive with the length of the opening in the solid propellant, liquid propellant inlet means at one end of the rotatably mounted member, and a plurality of liquid propellant outlet openings spaced along the rotatable member, each of said outlet openings communicating with a radially extending pipe member, each of said radially extending pipe members having a liquid propellant outlet angularly directed with respect to the axis of rotation of the rotatably mounted member whereby reaction of the liquid expelled through the liquid outlets causes the member to rotate rapidly and direct the liquid propellant outlet openings about the surface of the solid propellant exposed by the opening through said solid propellant.

5. In a liquid-solid propellant reaction propulsion device including a combustion chamber having a reaction outlet, a solid propellant in the combustion chamber provided with an opening therethrough communicating with the reaction outlet, and means for directing a liquid propellant to the surface of the solid propellant exposed by the opening comprising a member rotatably mounted within the opening in the solid propellant, said member having a length along its axis of rotation substantially coextensive with the length of the opening in the solid propellant, liquid propellant inlet means at one end of the rotatably mounted member, and a plurality of liquid propellant outlet openings spaced along the rotatable member, said outlet openings comprising angularly directed bores through the wall of the rotatably mounted member whereby reaction of the liquid expelled therethrough causes the member to rotate rapidly and direct the said liquid propellant outlet openings about the surface of the solid propellant exposed by the opening through the solid propellant.

6. In a liquid-solid propellant reaction propulsion device including a combustion chamber having a reaction outlet, a solid propellant in the combustion chamber provided with an opening therethrough communicating with the reaction outlet, and means for directing a liquid propellant to the surface of the solid propellant exposed by the opening comprising a member rotatably mounted within the opening in the solid propellant, said member having a length along its axis of rotation substantially coextensive with the length of the opening in the solid propellant, liquid propellant inlet means at one end of the rotatably mounted member, and a plurality of liquid propellant outlet openings spaced along the rotatable member, said outlet openings communicating with generally radially extending tubular members, the extended ends of each of said tubular members being angularly directed with respect to the axis of rotation of the rotatably mounted member whereby reaction of the liquid expelled therethrough causes the member to rotate rapidly and direct the said liquid propellant outlet openings in said radially extending tubular members about the surface of the solid propellant exposed by the opening therethrough.

7. In a liquid-solid propellant reaction propulsion device including a combustion chamber having a reaction outlet, a solid propellant in the combustion chamber provided with an opening therethrough communicating with the reaction outlet, and means for directing a liquid propellant to the surface of the solid propellant exposed by the opening comprising a member rotatably mounted within the opening in the solid propellant, said member having a length along its axis of rotation substantially coextensive with the length of the opening in the solid propellant, said member including a portion having an axis concentric to the opening in the solid propellant and an offset portion, liquid propellant inlet means in the concentric portion of the rotatably mounted member, and a plurality of liquid propellant outlet openings along the offset portion of the rotatably mounted member, said outlet opening being angularly directed with respect to the axis of rotation of said member whereby reaction of the liquid expelled therethrough causes the member to rotate rapidly and direct the said liquid propellant outlet openings about the surface of the solid propellant exposed by the opening through the solid propellant.

8. In a liquid-solid propellant reaction propulsion device including a combustion chamber having a reaction outlet, a solid propellant in the combustion chamber provided with an opening therethrough communicating with the reaction outlet, means for directing a liquid propellant substantially uniformly onto the surface of the solid propellant exposed by the opening therethrough comprising a member mounted within the opening in the solid propellant, said member being mounted for relative rotation with respect to the solid propellant and about an axis concentric to the opening through the solid propellant, said member having a length along the axis of relative rotation substantially coextensive with the length of the opening in the solid propellant, liquid propellant inlet means at one end of the member, and a plurality of liquid propellant outlet openings spaced along the member and means for bringing about relative rotation between the member and the solid propellant to direct the said liquid propellant outlet openings about the surface of the solid propellant exposed by the opening therethrough.

References Cited by the Examiner

UNITED STATES PATENTS

| 2,177,245 | 10/1939 | Dennis | 60—39.74 |
| 2,657,745 | 11/1953 | Bleecker | 60—39.74 |
| 2,672,011 | 3/1954 | Von Zborowski | 60—39.28 |
| 2,883,828 | 4/1959 | Howell | 60—35.6 |
| 2,996,880 | 8/1961 | Greiner | 60—35.6 |
| 3,009,317 | 11/1961 | Meyer et al. | 60—35.6 |
| 3,017,748 | 1/1962 | Burnside | 60—35.6 |
| 3,097,482 | 7/1963 | Lovingham | 60—35.6 |

CARLTON R. CROYLE, *Primary Examiner.*

SAMUEL FEINBERG, *Examiner.*